United States Patent
Ogawa et al.

(10) Patent No.: US 8,688,255 B2
(45) Date of Patent: Apr. 1, 2014

(54) ACTUATOR-LINK ASSEMBLY MANUFACTURING METHOD, ACTUATOR-LINK ASSEMBLY DESIGNING METHOD, AND ACTUATOR-LINK ASSEMBLY

(75) Inventors: Toshiaki Ogawa, Gifu (JP); Koji Itoh, Gifu (JP); Makoto Nagashima, Gifu (JP)

(73) Assignee: Nabtesco Corporation, Tokyo (JP)

( * ) Notice: Subject to any disclaimer, the term of this patent is extended or adjusted under 35 U.S.C. 154(b) by 357 days.

(21) Appl. No.: 13/037,907

(22) Filed: Mar. 1, 2011

(65) Prior Publication Data

US 2011/0220761 A1 Sep. 15, 2011

(30) Foreign Application Priority Data

Mar. 15, 2010 (JP) ................. 2010-056922

(51) Int. Cl.
*G06F 19/00* (2011.01)
*G06G 7/48* (2006.01)
(52) U.S. Cl.
USPC ..................... 700/97; 703/1; 703/8
(58) Field of Classification Search
None
See application file for complete search history.

(56) References Cited

U.S. PATENT DOCUMENTS

| 5,677,857 A * | 10/1997 | Hayashi et al. ........... 703/8 |
| 2005/0082434 A1 | 4/2005 | Stephan |
| 2007/0034748 A1 | 2/2007 | Sakurai et al. |
| 2010/0274374 A1 * | 10/2010 | Konstantinidis ................. 700/98 |
| 2011/0046926 A1 * | 2/2011 | Calmels ........................... 703/2 |

FOREIGN PATENT DOCUMENTS

| JP | 62-165007 | 7/1987 |
| JP | 05-097095 | 4/1993 |
| JP | H09-119459 A | 5/1997 |
| JP | H09-136698 A | 5/1997 |
| JP | H09-146606 A | 6/1997 |

OTHER PUBLICATIONS

An Office Action; "Notification of Reasons for Refusal," issued by the Japanese Patent Office on Oct. 2, 2013, which corresponds to Japanese Patent Application No. 2010-056922 and is related to U.S. Appl. No. 13/037,907; with Concise Explanation.

* cited by examiner

*Primary Examiner* — Sean Shechtman
(74) *Attorney, Agent, or Firm* — Studebaker & Brackett PC

(57) ABSTRACT

In a material determining step, the material constituting an actuator and the material constituting a link are determined such that at least one of the materials contains fiber reinforced plastic. In a computing step, a computation model that defines the relationship between a control surface, the actuator, and the link is used to compute the change in gain margin with the change in a rigidity ratio, which is the ratio of the rigidity of the link to the rigidity of the actuator. The rigidities of the actuator and the link are determined in a rigidity determining step based on a result of the above-described computation, the shapes of the actuator and the link are determined in a shape determining step, and the actuator and the link are formed in a formation step, and are assembled in an assembly step.

4 Claims, 10 Drawing Sheets

ACTUATOR-LINK ASSEMBLY MANUFACTURING METHOD, ACTUATOR-LINK ASSEMBLY DESIGNING METHOD, AND ACTUATOR-LINK ASSEMBLY

CROSS-REFERENCE TO RELATED APPLICATIONS

This application claims priority to Japanese Patent Application No. 2010-056922. The entire disclosure of Japanese Patent Application No. 2010-056922 is hereby incorporated herein by reference.

BACKGROUND OF THE INVENTION

1. Field of the Invention

The present invention relates to an actuator-link assembly including an actuator that can be attached to a control surface of an aircraft or to a horn arm member in order to drive the control surface, and a link that is connected to the actuator, a manufacturing method for manufacturing the actuator-link assembly, and a designing method for designing the actuator-link assembly.

2. Description of Related Art

An aircraft is provided with control surfaces that are formed as moving surfaces (flight control surfaces) and are configured as an aileron, a rudder, an elevator, and the like. As an actuator for driving such a control surface and a link that is connected to this actuator, those disclosed in JP H5-97095A and JP S62-165007A are known. With the actuator-link assemblies disclosed in JP H5-97095A and JP S62-165007A, the actuators are provided as a hydraulically driven cylinder mechanism that can be attached to a control surface or a horn arm member attached to the control surface, and the links are coupled pivotably to the actuator and the control surface.

The actuator-link assemblies for driving a control surface of an aircraft as disclosed in JP H5-97095A and JP S62-165007A are required to have high strength in order to support the load for driving the control surface, and are also required to have high rigidity from the viewpoint of suppressing the deformation and ensuring the stability as the control systems for driving the control surface. For this reason, when the actuator-link assemblies as disclosed in JP H5-97095A and JP S62-165007A are designed and also when they are manufactured, a metallic material such as stainless steel or a titanium alloy can be selected as the material constituting the actuator-link assemblies from the viewpoint of ensuring the required strength and rigidity. However, since the actuator-link assemblies are made of a metallic material, there is a limit to their weight reduction, and it is difficult to achieve further weight reduction in the current situation.

When a titanium alloy is used as the material constituting an actuator-link assembly, a high specific rigidity, which is the rigidity per unit weight, can be ensured, but the specific strength, which is the strength per unit weight, is reduced. For this reason, ensuring the strength becomes a constraint, making it difficult to achieve weight reduction. On the other hand, when stainless steel is used as the material constituting an actuator-link assembly, a high specific strength can be ensured, but the specific rigidity is reduced. For this reason, ensuring the rigidity becomes a constraint, making it difficult to achieve weight reduction.

Therefore, in order to provide an actuator-link assembly that can ensure strength and rigidity in good balance and achieve weight reduction, it is necessary to design the structure of an actuator-link assembly from a point of view that is completely different from that of conventional technology. Also, in addition to achieving weight reduction, it is necessary to ensure strength and rigidity that are equivalent to or greater than those achieved by the conventional technology.

SUMMARY OF THE INVENTION

In view of the above-described situation, it is an object of the present invention to provide an actuator-link assembly that can ensure strength and rigidity that are equivalent to or greater than those achieved by the conventional technology while achieving further weight reduction, a manufacturing method of the actuator-link assembly, and a designing method of the actuator-link assembly.

According to a feature of an actuator-link assembly manufacturing method of the present invention for achieving the above-described object, there is provided an actuator-link assembly manufacturing method for manufacturing an actuator that can be attached pivotably, at one end thereof, to a control surface of an aircraft or to a horn arm member attached to the control surface in order to drive the control surface, and a link that is coupled to the actuator, the method including: a material determining step of determining a material constituting the actuator and a material constituting the link; a computing step of computing a change in gain margin with a change in a rigidity ratio, which is the ratio of the rigidity of the link to the rigidity of the actuator, using a computation model that includes an inertial mass of the control surface, a rigidity of the control surface, a rigidity of the actuator, and a rigidity of the link as parameters and that defines a relationship between the parameters; a rigidity determining step of determining rigidities of the actuator and the link such that the rigidity ratio and the gain margin fall within respective predetermined ranges, based on a computation result obtained in the computing step; a shape determining step of determining shapes of the actuator and the link such that rigidities of the actuator and the link are set to the rigidities determined in the rigidity determining step; a formation step of forming the actuator and the link into the shapes determined in the shape determining step; and an assembly step of coupling and assembling the actuator and the link formed in the formation step, wherein the link is attached pivotably to a fulcrum shaft for rotatably supporting the control surface, and is also attached pivotably to the other end of the actuator via a pivot shaft, and, in the material determining step, the materials are determined such that at least one of the material constituting the actuator and the material constituting the link contains fiber reinforced plastic.

With this configuration, the material constituting the actuator for driving the control surface and the material constituting the link that is coupled to the actuator are determined such that at least one of the materials contains fiber reinforced plastic. Accordingly, it is possible to achieve an actuator-link assembly that has a significantly smaller specific gravity (i.e., also has a significantly smaller density), a significantly greater specific strength and a significantly greater specific rigidity than that achieved with a titanium alloy. Further, it is possible to achieve an actuator-link assembly that has a significantly greater specific strength and a significantly greater specific rigidity than that achieved with stainless steel. Also, based on the computation result obtained using the computation model for the control surface, the actuator, and the link, the rigidities of the actuator and the link are determined such that the rigidity ratio of the link to the actuator and the gain margin fall within their respective predetermined ranges that have been set. Consequently, the rigidity of the actuator-link assembly containing fiber reinforced plastic as the constituent material can be reliably determined to be a level capable of sufficiently suppressing deformation and ensuring sufficient stability as the control system for driving the control surface. Also, the shapes of the actuator and the link are determined such that the rigidities determined in the above described manner can be set, and the actuator and the link are formed in the shapes determined in the above-described manner. Further, the actuator and the link are coupled and assembled, thus completing the actuator-link assembly. Thus, it is possible to manufacture an actuator-link assembly that can realize weight reduction compared with conventional actuator-link assemblies made of metals such as a titanium alloy and stainless steel, and ensure strength and rigidity that are equal to or greater than those achieved with such actuator-link assemblies.

Accordingly, with this configuration, it is possible to manufacture an actuator-link assembly that can ensure strength and rigidity that are equal to or greater than those achieved with their conventional counterparts, and realize further weight reduction.

According to a first feature of the actuator-link assembly designing method of the present invention for achieving the above-described object, there is provided an actuator-link assembly designing method for designing an actuator that can be attached pivotably, at one end thereof, to a control surface of an aircraft or to a horn arm member attached to the control surface in order to drive the control surface, and a link that is coupled to the actuator, the method including: a material determining step of determining a material constituting the actuator and a material constituting the link; a computing step of computing a change in gain margin with a change in a rigidity ratio, which is the ratio of the rigidity of the link to the rigidity of the actuator, using a computation model that includes an inertial mass of the control surface, a rigidity of the control surface, a rigidity of the actuator, and a rigidity of the link as parameters and that defines a relationship between the parameters; a rigidity determining step of determining rigidities of the actuator and the link such that the rigidity ratio and the gain margin fall within respective predetermined ranges, based on a computation result obtained in the computing step; and a shape determining step of determining shapes of the actuator and the link such that rigidities of the actuator and the link are set to the rigidities determined in the rigidity determining step, wherein the link is attached pivotably to a fulcrum shaft for rotatably supporting the control surface, and is also attached pivotably to the other end of the actuator via a pivot shaft, and, in the material determining step, the materials are determined such that at least one of the material constituting the actuator and the material constituting the link contains fiber reinforced plastic.

With this configuration, the material constituting the actuator for driving the control surface and the material constituting the link that is coupled to the actuator are determined such that at least one of the materials contains fiber reinforced plastic. Accordingly, it is possible to achieve an actuator-link assembly that has a significantly smaller specific gravity (i.e., also has a significantly smaller density), a significantly greater specific strength and a significantly greater specific rigidity than that achieved with a titanium alloy. Further it is possible to achieve an actuator-link assembly that has a significantly greater specific strength and a significantly greater specific rigidity than that achieved with stainless steel. Also, based on the computation result obtained using the computation model for the control surface, the actuator, and the link, the rigidities of the actuator and the link are determined such that the rigidity ratio of the link to the actuator and the gain margin fall within their respective predetermined ranges that have been set. Consequently, the rigidity of the actuator-link assembly containing fiber reinforced plastic as the constituent material can be reliably determined to be a level capable of sufficiently suppressing deformation and ensuring sufficient stability as the control system for driving the control surface. Also, the design of the actuator and the link is completed upon determination of their shapes such that the rigidities determined in the above described manner can be set. Thus, it is possible to design an actuator-link assembly that can realize weight reduction compared with conventional actuator-link assemblies made of metals such as a titanium alloy and stainless steel, and ensure strength and rigidity that are equal to or greater than those achieved with such actuator-link assemblies.

According to a second feature of actuator-link assembly designing method of the present invention, in the actuator-link assembly designing method having the first feature, the link includes: a pair of linear portions disposed alongside each other and each extending linearly; a coupling portion connecting to one end of each of the pair of linear portions on the same side via a bent portion and extending so as to couple the one end of each of the pair of linear portions on the same side to each other; a fulcrum shaft attachment portion that is provided so as to protrude from a center portion of the coupling portion and that can be attached pivotably to a fulcrum shaft for rotatably supporting the control surface; and an actuator attachment portion that is provided as the other end of each of the pair of linear portions and that can be attached pivotably to the other end of the actuator via a pivot shaft, and, in the material determining step, the materials are determined such that a material constituting the pair of linear portions and the coupling portion contains fiber reinforced plastic.

With this configuration, in order to stably drive the control surface via actuation of the actuator, the link is designed that is formed in the shape of a portal including the pair of linear portions and the coupling portion coupling to the pair of linear portions via the bent portions. In the case of a portal-shaped link including bent portions, it is difficult to realize weight reduction, while ensuring strength and rigidity in good balance. However, with this designing method, the material constituting the pair of linear portions and the coupling portion of the link is determined to be fiber reinforced plastic, and therefore it is possible to ensure strength and rigidity in good balance at a higher level, and to realize significant weight reduction.

According to a third feature of the actuator-link assembly designing method of the present invention, in the actuator-link assembly designing method having the first feature, the computation model used in the computing step defines a relationship between the parameters, as a spring-mass model in which the inertial mass of the control surface, a spring obtained by modeling the rigidity of the control surface, a spring obtained by modeling the rigidity of the actuator, and a spring obtained by modeling the rigidity of the link are coupled in series.

With this configuration, the computation model used in the computing step is configured for the control surface, the actuator, and the link as a spring-mass model in which the inertial mass and the springs thereof are coupled in series. Accordingly, a computation model for more accurately defining the relationship between the parameters of the inertial mass of the control surface, the rigidity of the control surface, the rigidity of the actuator, and the rigidity of the link can be achieved with a simple computation model, based on the actual relationship between the control surface, the actuator, and the link that are coupled in series.

According to a feature of an actuator-link assembly of the present invention for achieving the above-described object, there is provided an actuator-link assembly including an actuator that can be attached pivotably, at one end thereof, to a control surface of an aircraft or to a horn arm member attached to the control surface in order to drive the control surface, and a link that is coupled to the actuator, wherein the link includes: a pair of linear portions disposed alongside each other and each extending linearly; a coupling portion connecting to one end of each of the pair of linear portions on the same side via a bent portion and extending so as to couple the one end of each of the pair of linear portions on the same side to each other; a fulcrum shaft attachment portion that is provided so as to protrude from a center portion of the coupling portion and that can be attached pivotably to a fulcrum shaft for rotatably supporting the control surface; and an actuator attachment portion that is provided as the other end of each of the pair of linear portions and that can be attached pivotably to the other end of the actuator via a pivot shaft, and a material constituting the pair of linear portions and the coupling portion contains fiber reinforced plastic.

With this configuration, in order to stably drive the control surface via actuation of the actuator, the link is provided that is formed in the shape of a portal including the pair of linear portions and the coupling portion coupling to the pair of linear portions via the bent portions. In the case of a conventional portal-shaped link that is made of a metallic material such as a titanium alloy or stainless steel and that includes bent portions, it is difficult to realize further weight reduction, while ensuring strength and rigidity in good balance. However, with this configuration, a material constituting the pair of linear portions and the coupling portion of the link contains fiber reinforced plastic. Accordingly, it is possible to achieve an actuator-link assembly that has a significantly smaller specific gravity (i.e., also has a significantly smaller density), a significantly greater specific strength and a significantly greater specific rigidity than that achieved with a titanium alloy. Further, it is possible to achieve an actuator-link assembly that has a significantly greater specific strength and a significantly greater specific rigidity than that achieved with stainless steel. This makes it possible to ensure strength and rigidity in good balance at a higher level and to realize significant weight reduction for an actuator-link assembly. Thus, it is possible, with this configuration, to realize weight reduction for an actuator-link assembly including a portal-shaped link, compared with conventional actuator-link assemblies made of metals such as a titanium alloy and stainless steel, and to ensure strength and rigidity that are equal to or greater than those achieved with the conventional actuator-link assemblies.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. The embodiment of the present invention can be widely applied to an actuator-link assembly including an actuator that can be attached to a control surface of an aircraft or to a horn arm member in order to drive the control surface and a link that is coupled to the actuator, a manufacturing method for manufacturing the actuator-link assembly, and a designing method for designing the actuator-link assembly.

[Actuator-Link Assembly]

Figure 1:
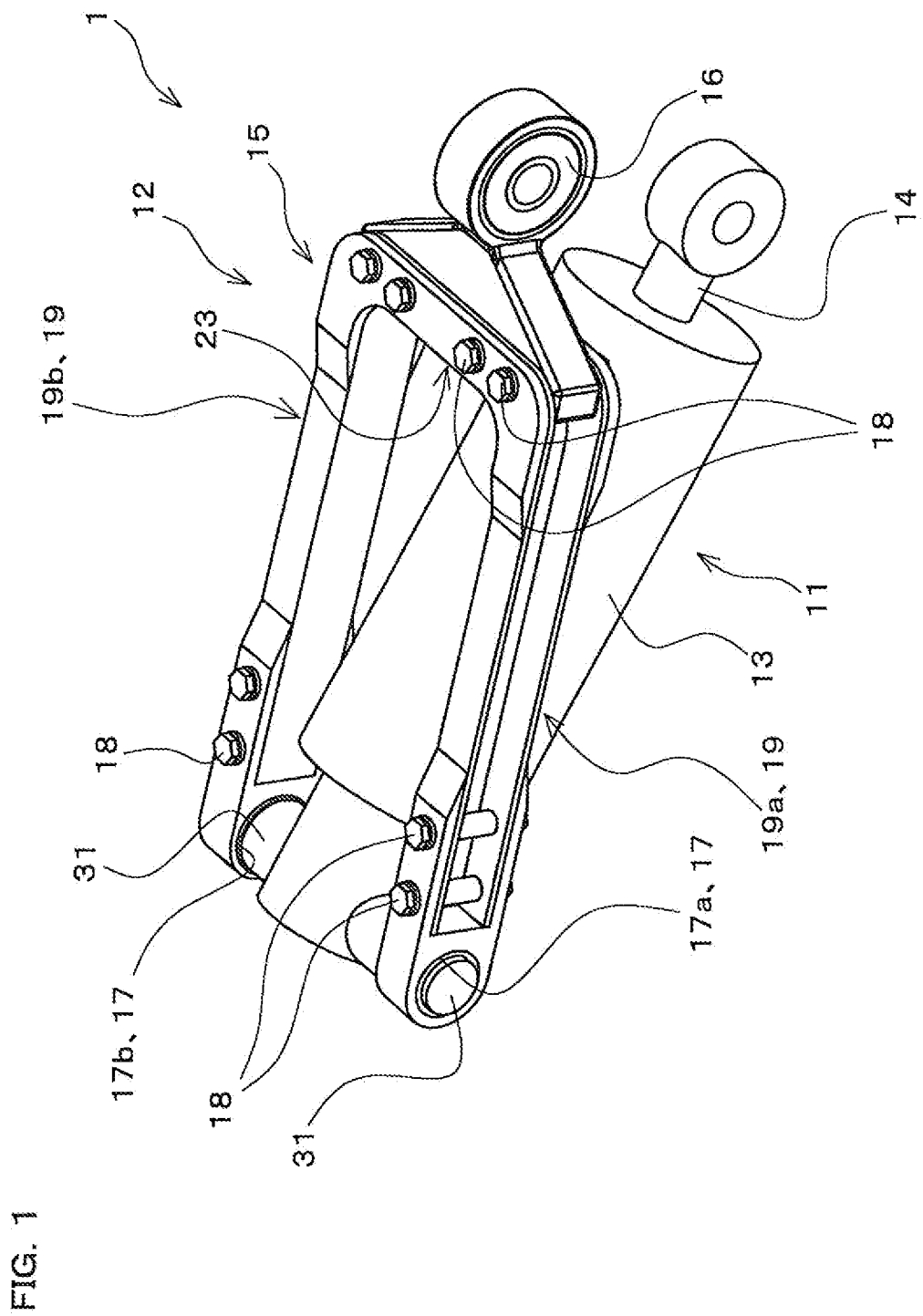
FIG. 1 is a perspective view showing an actuator-link assembly according to one embodiment of the present invention.
Figure 2:
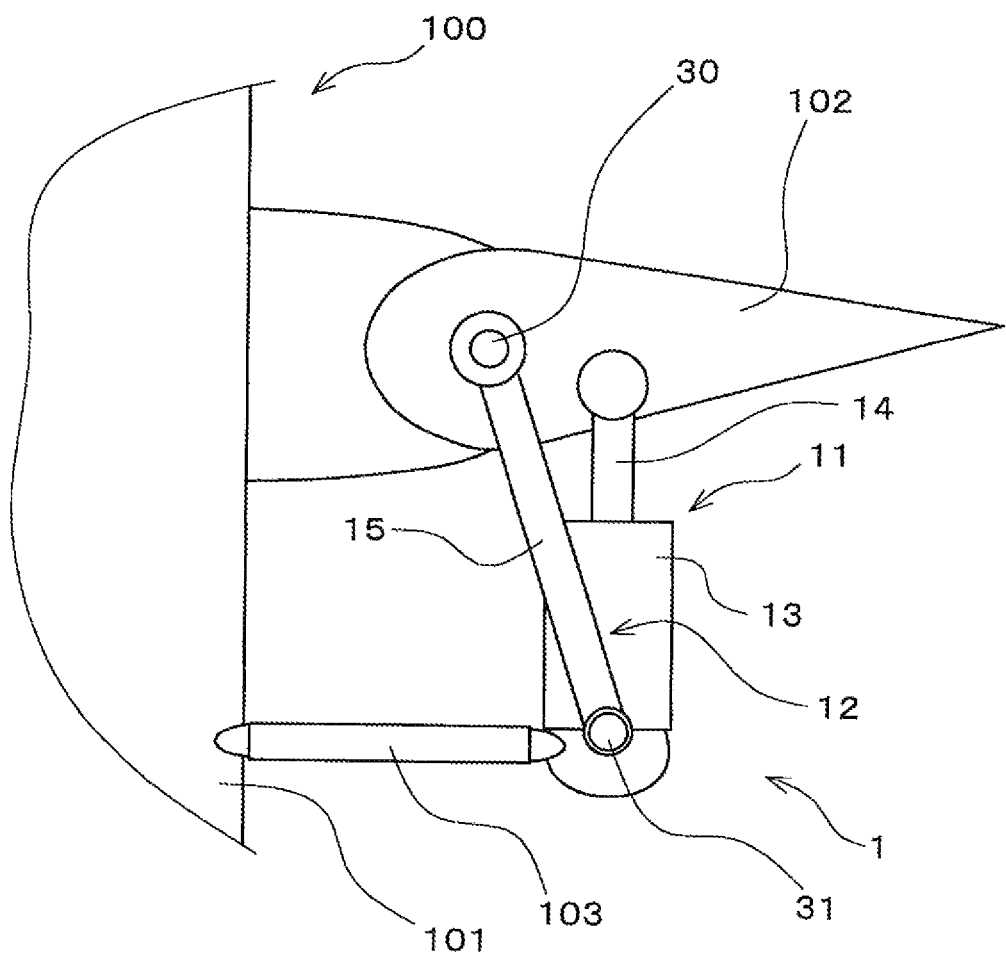
FIG. 2 is a schematic diagram showing a state in which the actuator-link assembly shown in FIG. 1 is attached to a body of an aircraft, together with a part of the body.

FIG. 1 is a perspective view showing a control surface drive unit 1 that is provided as a unit for driving a control surface of an aircraft and that constitutes an actuator-link assembly according to an embodiment of the present invention. FIG. 2 is a schematic diagram showing a state in which the control surface drive unit 1 is attached to a body 100 of the aircraft, together with a part of the body 100. Examples of aircraft moving surfaces (flight control surfaces) constituting the control surface 102 include an aileron, a rudder, and an elevator. The control surface drive unit 1 may also be used as a unit for driving control surfaces configured as a flap, a spoiler, and the like.

The control surface drive unit 1 shown in FIGS. 1 and 2 includes an actuator 11 for driving the control surface 102 and a reaction link 12 constituting a link of this embodiment that is coupled to the actuator 11. As will be described later, the control surface drive unit 1 is designed by an actuator-link assembly designing method according to an embodiment of the present invention, and is manufactured by an actuator-link assembly manufacturing method according to an embodiment of the present invention.

The actuator 11 is provided as a hydraulically driven cylinder mechanism, and includes a cylindrical cylinder body 13 and a round bar-shaped rod portion 14 having a circular cross section. The cylinder body 13 is actuated by supplying and discharging pressure oil to and from the inside of the cylinder body 13 using a hydraulic system (not shown) provided in the aircraft (not shown), and the rod portion 14 is actuated such that it is displaced so as to extend or contract from or into the cylinder body 13. The cylinder body 13 and the rod portion 14 are made of stainless steel, for example. The material constituting the actuator 11 is determined by the actuator-link assembly designing method described below.

At the tip end of the rod portion 14, which is located at one end of the actuator 11, the actuator 11 is attached pivotably to the control surface 102 via a hinge portion or the like. At an end of the cylinder body 13, which is located at the other end of the actuator 11, the actuator 11 is supported relative to a body frame 101 via a supporting member 103. Further, the actuator 11 is coupled pivotably to the supporting member 103 (in FIG. 1, the illustration of the coupling between the actuator 11 and the supporting member 103 has been omitted). Note that the tip end of the rod portion 14 need not be directly attached to the control surface 102, and may be attached pivotably to a horn arm member attached to the control surface 102. In this case, the horn arm member is configured as a member that is attached to the control surface 102 so as to be pivotable together with the control surface 102 (i.e., fixed to the control surface 102), and that is coupled pivotably to the tip of the rod portion 14 of the actuator 11. Accordingly, the actuator 11 drives the control surface 102 via the horn arm member.

As shown in FIG. 2, the reaction link 12 is attached to the body frame 101 of the body 100, and is provided so as to prevent a load applied to the control surface 102 from directly affecting the body frame 101. Further, as shown in FIGS. 1 and 2, the reaction link 12 is coupled to the actuator 11, and includes a reaction link body 15, a bearing 16, bushes 17, fastening members 18, and so forth.

Figure 3:
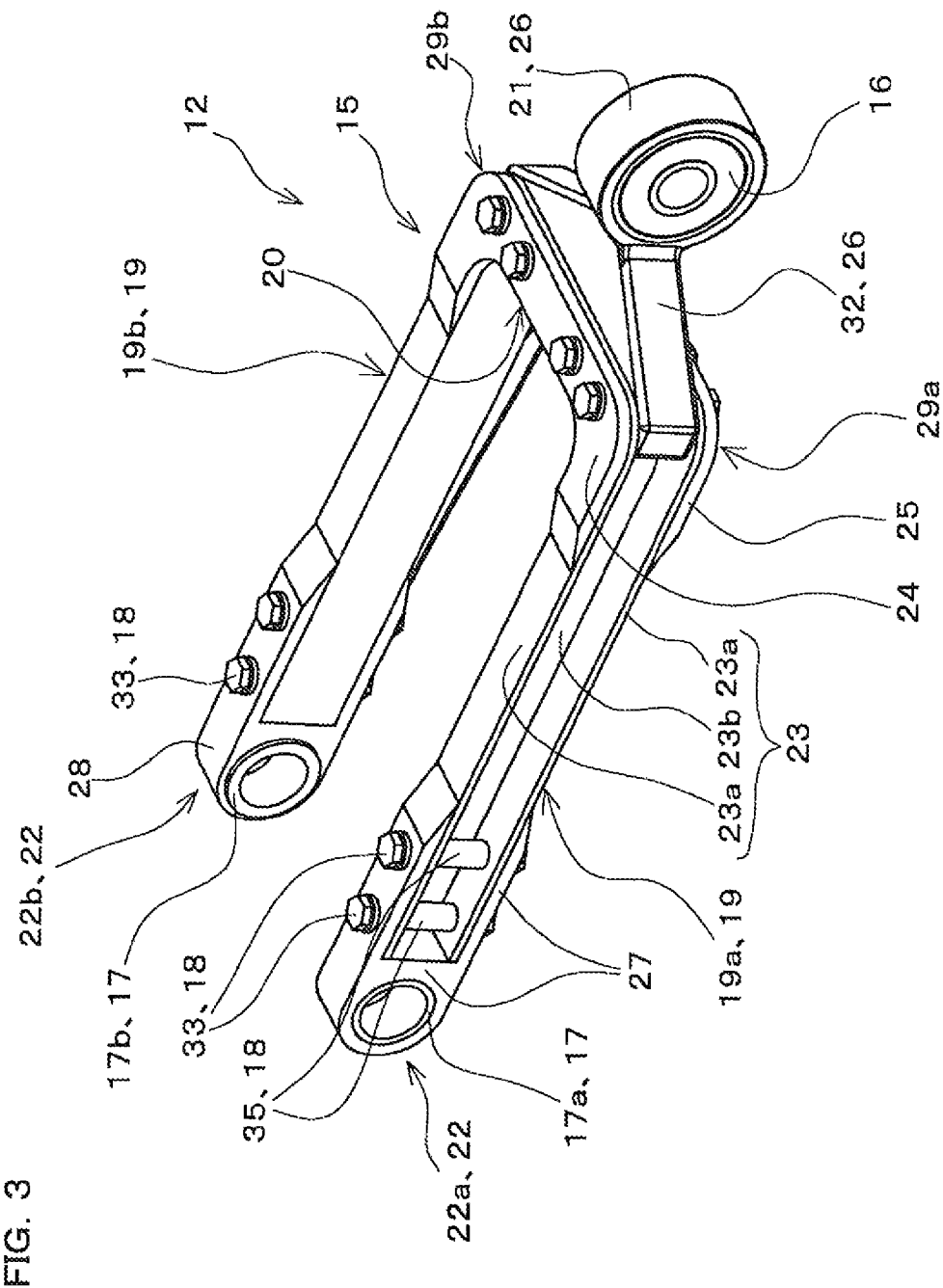
FIG. 3 is a perspective view of the link shown in FIG. 1.
Figure 4:
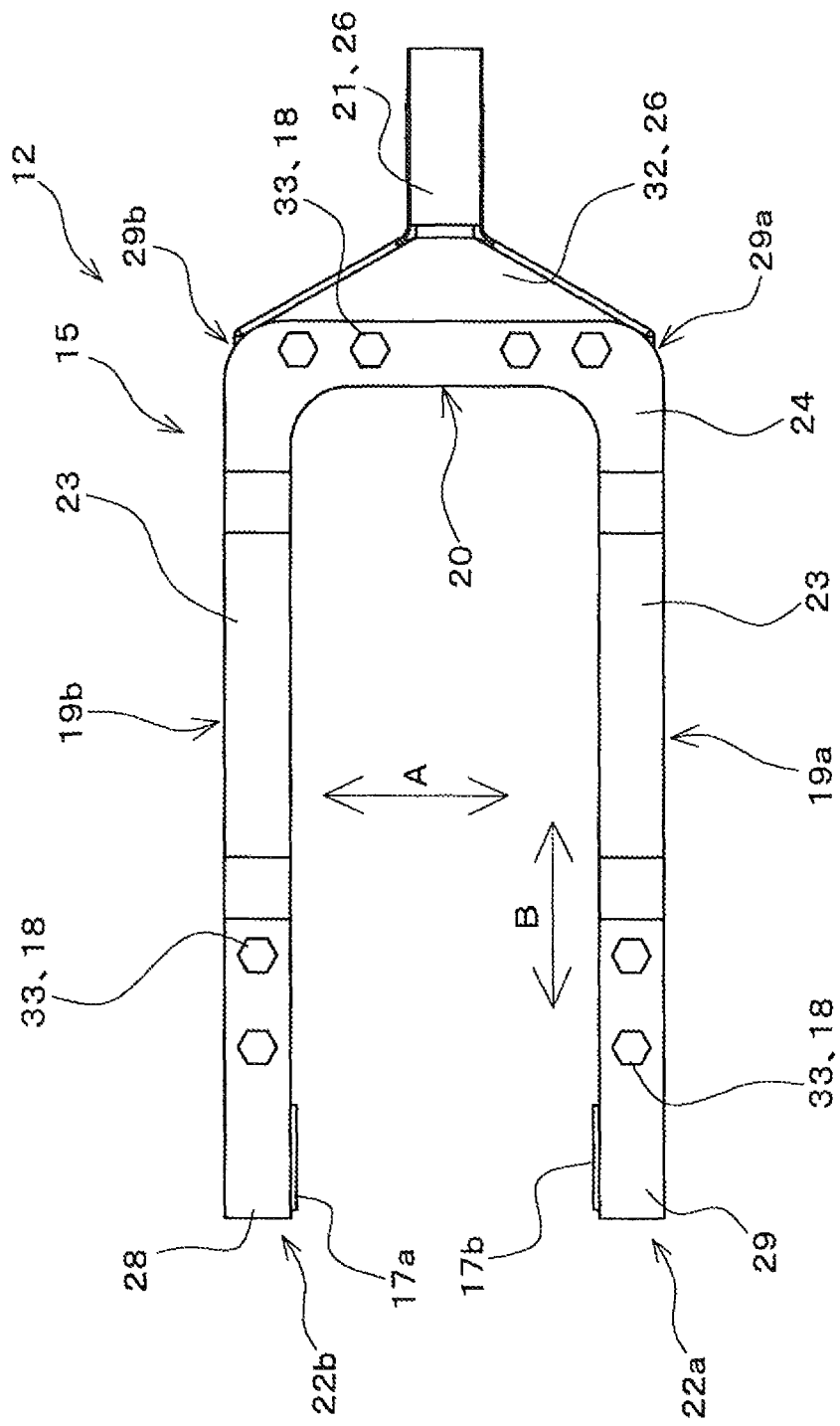
FIG. 4 is a plan view of the link shown in FIG. 3.
Figure 5:
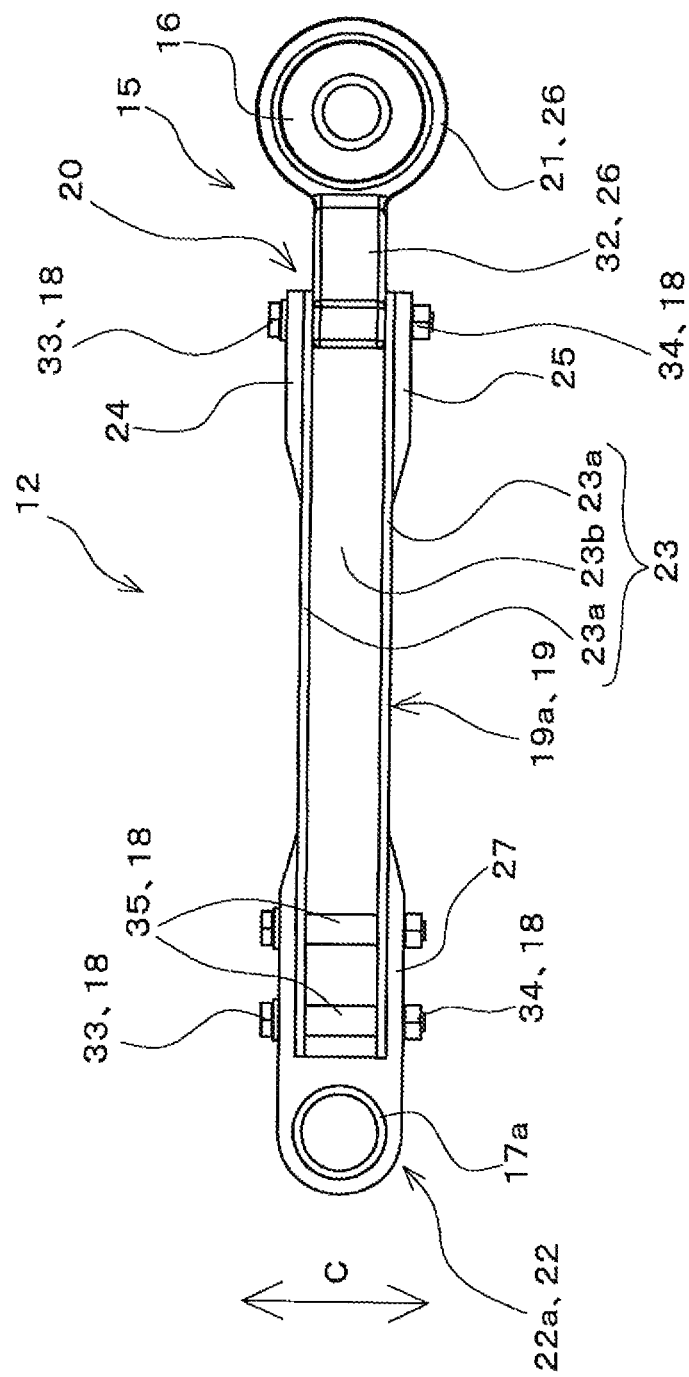
FIG. 5 is a side view of the link shown in FIG. 3.

FIG. 3 is a perspective view of the reaction link 12. FIG. 4 is a plan view of the reaction link 12, and FIG. 5 is a side view of the reaction link 12. The reaction link body 15 of the reaction link 12 shown in FIGS. 1 to 5 is made of carbon fiber reinforced plastic (CFRP). Also, the reaction link body 15 is formed in the shape of a portal, and includes a pair of linear portions 19 (19a, 19b), a coupling portion 20, a fulcrum shaft attachment portion 21, and actuator attachment portions 22. Note that the reaction link body 15 includes a plurality of members (23 to 28) made of carbon fiber reinforced plastic, as will be described later. The reaction link body 15 is configured by bonding the plurality of members (23 to 28) together into one unit, thus forming the pair of linear portions 19, the coupling portion 20, the fulcrum shaft attachment portion 21, and the actuator attachment portions 22 described above. Due to this configuration, the material constituting the pair of linear portions 19 and the coupling portion 20 is fiber reinforced plastic.

Note that the reaction link body 15 may be made of reinforced plastic other than carbon fiber-reinforced plastic described above. For example, the reaction link body 15 may be made of fiber reinforced plastics such as glass fiber reinforced plastic, glass mat reinforced plastic, boron fiber reinforced plastic, aramid fiber reinforced plastic, polyethylene fiber reinforced plastic, and Zylon fiber reinforced plastic.

The pair of linear portions 19 of the reaction link body 15 are made up of a linear portion 19a and a linear portion 19b disposed substantially parallel to each other and each extending linearly. The coupling portion 20 is formed as a portion extending so as to connect to one end of each of the pair of linear portions 19 on the same side via bent portions (29a, 29b) and to couple those ends to each other. Note that the coupling portion 20 is formed so as to extend in a direction substantially orthogonal to the linear portion 19a and the linear portion 19b, and the bent portions (29a, 29b) are formed as portions that are bent at substantially a right angle. Also, the coupling portion 20 is formed so as to connect to one end of the linear portion 19a via the bent portion 29a, to connect to one end of the linear portion 19b via the bent portion 29b, and to couple those ends of the pair of linear portions 19a and 19b to each other.

The fulcrum shaft attachment portion 21 of the reaction link body 15 is provided so as to protrude from the center portion of the coupling portion 20 (the center portion in the direction in which the pair of linear portions 19 are coupled) toward the control surface 102. Also, the fulcrum shaft attachment portion 21 is provided as a portion that can be attached pivotably via the bearing 16 to a fulcrum shaft 30 (see FIG. 2) for rotatably supporting the control surface 102 with respect to the body frame 101. Further, the fulcrum shaft attachment portion 21 is formed as a cylindrical portion integrated with the coupling portion 20 and having a shorter axial length, and the outer ring of the bearing 16 described above is fixed by fitting to the inner wall of the fulcrum shaft attachment portion 21. By providing the fulcrum shaft attachment portion 21 and the bearing 16 in this way, the reaction link body 15 is coupled pivotably to the control surface 102 at the fulcrum shaft attachment portion 21.

The actuator attachment portions 22 of the reaction link body 15 are respectively provided as the other ends of the pair of linear portions 19 that are opposite from the coupling portion 20. Also, the actuator attachment portions 22 are made up of an actuator attachment portion 22a that is the other end of the linear portion 19a and an actuator attachment portion 22b that is the other end of the linear portion 19b.

Further, a through hole is formed in each of the actuator attachment portions (22a, 22b), and the bushes 17 are attached by fitting to the through holes. The bushes 17 are made up of a bush 17a for being fixed to the actuator attachment portion 22a and a bush 17b for being fixed to the actuator attachment portion 22b. The bushes 17a and 17b are each formed in a cylindrical shape having a through hole through which a pivot shaft 31, which will be described later, passes. Also, the bushes (17a, 17b) are each configured as a slidable member whose inner perimeter comes into slidable contact with the outer perimeter of the pivot shaft 31. Consequently, each of the actuator attachment portions (22a, 22b) is attached pivotably to the pivot shaft 31.

As shown in FIG. 1, the pivot shafts 31 described above are provided as a pair of cylindrical portions that are formed integrally with the cylinder body 13 at the other end of the cylinder body 13 of the actuator 11 (the side opposite from the side where the rod portion 14 protrudes). Also, the pivot shafts 31 are formed so as to protrude in the opposite directions from each other along the same straight line on both lateral sides of the other end of the cylinder body 13. The pivot shafts 31 come into slidable contact with the bushes 17 and are supported in a rotatable state. Consequently, the actuator attachment portions (22a, 22b) of the reaction link body 15 are attached pivotably to the other end of the actuator 11 via the bushes 17 and the pivot shafts 31. Thus, the reaction link body 12 is coupled pivotably to the actuator 11 and the control surface 102.

Although a case where the pivot shafts 31 are formed integrally with the cylinder body 13 is described above as an example, this need not be the case. For example, pivot shafts 31 that are each formed as a separate part may be fixed to the cylinder body 13, or the other end of the cylinder body 13 may be attached rotatably to pivot shafts 31 that are each provided as a separate part. Although this embodiment has been described taking, as an example, the bushes 17 as elements for rotatably holding the pivot shafts 31 relative to the actuator attachment portions 22, this need not be the case. For example, bearings may be provided as elements for rotatably holding the pivot shafts 31 relative to the actuator attachment portions 22.

As described above, the reaction link body 15 is configured by integrating the plurality of members (23 to 28) made of carbon fiber reinforced plastic into one unit. As the plurality of members (23 to 28), a body member 23, coupling portion surface members (24, 25), a coupling portion end member 26, and linear portion end members (27, 28) are provided in the reaction link body 15.

The body member 23 is provided as a member constituting the basic skeleton of the pair of linear portions 19 and the coupling portion 20, and extending across the pair of linear portions 19 and the coupling portion 20. The body member 23 includes a pair of plate-like portions (23a, 23a) and a bridging portion 23b, and is configured by integrally forming these portions into one unit. The pair of plate-like portions (23a, 23a) are each formed in a plate shape and are provided as a pair of portions that are arranged parallel to each other. The bridging portion 23b is provided as a portion that is connected, substantially perpendicularly, to one edge of each of the pair of plate-like portions (23a, 23a) and that bridges the pair of plate-like portions (23a, 23a) by coupling them. Accordingly, the cross section of the body member 23 that is perpendicular to the pair of plate-like portions (23a, 23a) and the bridging portion 23b is formed in a cross-sectional shape such as that of a square pipe one side of which is absent and thus is open. Forming such a cross sectional shape enables a configuration that can ensure a large geometrical moment of inertia.

The pair of plate-like portions (23a, 23a) and the bridging portion 23b are provided so as to extend across the pair of linear portions 19 and the coupling portion 20. The pair of plate-like portions 23a are disposed alongside each other in the thickness direction of the reaction link body 15 (the direction indicated by the double-ended arrow C in FIG. 5). Note that the thickness direction of the reaction link body 15 is defined as the direction that is perpendicular to both the width direction of the reaction link body 15 (the direction indicated by the double-ended arrow A in FIG. 4) and the longitudinal direction of the pair of linear portions 19 (19a, 19b) (the direction indicated by the double-ended arrow B in FIG. 4). The width direction of the reaction link body 15 is defined as the direction in which the pair of linear portions 19 (19a, 19b) are disposed alongside each other.

The coupling portion surface members (24, 25) are each provided as a plate-like member having two portions extending in a curved manner, and are each disposed extending from the coupling portion 20 to one end of each of the pair of linear portions 19. Also, the coupling portion surface member 24 and the coupling portion surface member 25 are respectively disposed on opposite surfaces in the thickness direction of the reaction link body 15, and are disposed symmetrically with respect to the body member 23. These coupling portion surface members (24, 25) are respectively attached to the surfaces of the pair of plate-like portions (23a, 23a) of the body member 23.

The coupling portion end member 26 includes a base portion 32 constituting a part of the coupling portion 20, and the above-described fulcrum shaft attachment portion 21 that is formed integrally with the base portion 32 and that holds the bearing 16. The base portion 32 is disposed along the coupling portion 20, and is formed in a block shape protruding so as to be tapered symmetrically in the width direction of the reaction link body 15 toward the control surface 102. Also, the base portion 32 is attached to the body member 23 in a state in which it is sandwiched between the pair of plate-like portions (23a, 23a). The fulcrum shaft attachment portion 21 that is formed as a cylindrical portion having a shorter axial length and integrated with the tip end of the base portion 32 is disposed such that its axial direction (the direction of the cylinder axis) is parallel to the width direction of the reaction link body 15.

The linear portion end members (27, 28) are provided as members respectively constituting the other ends of the pair of linear portions 19. The linear portion end member 27 is provided so as to constitute the other end of the linear portion 19a, and the linear portion end member 28 is provided so as to constitute the other end of the linear portion 19b. Further, the linear portion end member 27 is provided with a bush holding portion in which a through hole for holding the bush 17a is formed, and a pair of protruding portions formed in the shape of plates extending parallel to each other and protruding from the bush holding portion in the longitudinal direction of the linear portion 19a. Likewise, the linear portion end member 28 is provided with a bush holding portion in which a through hole for holding the bush 17b is formed, and a pair of protruding portions formed in the shape of plates extending parallel to each other and protruding from the bush holding portion in the longitudinal direction of the linear portion 19b. Also, the pair of protruding portions of each of the linear portion end member (27, 28) are attached to the pair of plate-like portions (23a, 23a) of the body member 23 on opposite surfaces in the thickness direction of the reaction link body 15.

As clearly shown in FIGS. 3 to 5, the fastening members 18 each include a plurality of bolts 33, a plurality of nuts 34 that are respectively screwed to the bolts 33, and a plurality of straight bushes 35, and are configured to bond the plurality of members (23 to 28) together into one unit. By the bolts 33 and the nuts 34 of the fastening members 18 being screwed to each other, the plurality of members (23 to 28) are bonded together in a state in which they are disposed overlapping in the thickness of the reaction link body 15. Note that the straight bushes 35 are each formed as a cylindrical member.

Of the plurality of bolts 33 (in this embodiment, eight bolts 33) of the fastening members 18, some of the bolts 33 (in this embodiment, four bolts 33) are disposed alongside each other along the coupling portion 20. Furthermore, the bolt shaft of each of the bolts 33 disposed along the coupling portion 20 extends along and passes through the coupling portion surface member 24, one of the pair of plate-like portions (23a, 23a), the base portion 32 of the coupling portion end member 26, the other of the pair of plate-like portions (23a, 23a), and the coupling portion surface member 25. Also, the bolt head of each of the aforementioned bolts 33 abuts against the coupling portion surface member 24, and the opposite end of the bolt head protrudes from the coupling portion surface member 25 and is screwed to each of the nuts 34. Consequently, the plurality of members (23, 24, 25, 26) are disposed overlapping in the thickness direction of the reaction link body 15 and are bonded together by the fastening members 18. Note that the coupling portion surface members (24, 25), the body member 23, and the coupling portion end member 26 are provided, for example, as members having different carbon fiber orientations in a direction perpendicular to the thickness direction of the reaction link body 15.

On the other hand, the remaining bolts 33 (in this embodiment, four bolts 33) of the fastening members 18 are respectively disposed at the other ends of the pair of linear portions 19 (19a, 19b). The bolt shaft of each of the bolts 33 disposed at the other end of the linear portion 19a passes through the pair of protruding portions of the linear portion end member 27, the pair of plate-like portions (23a, 23a) of the body member 23, and the straight bushes 35. Also, the bolt head of each of the aforementioned bolts 33 abuts against one of the pair of protruding portions of the linear portion end member 27, and the opposite end of the bolt head protrudes from the other of the pair of protruding portions and is screwed to the nut 34.

Note that the straight bushes 35 are disposed between the pair of plate-like portions (23a, 23a), with both of their ends in the direction of the cylinder axis respectively abutting against the pair of plate-like portions (23a, 23a). By the straight bushes 35, the pair of plate-like portions (23a, 23a) are prevented from deformation that could be caused by fastening power exerted when the bolts 33 and the nuts 34 are screwed together.

As described above, the plurality of members (23, 27) are disposed overlapping in the thickness direction of the reaction link body 15 and are bonded together by the fastening members 18 (33, 34, 35) disposed at the other end of the linear portion 19a. Further, the fastening members 18 (33, 34, 35) disposed at the other end of the linear portion 19b are also provided for the reaction link body 15, as with the fastening members 18 (33, 34, 35) disposed at the other end of the linear portion 19a. Also, the plurality of members (23, 28) are disposed overlapping in the thickness direction of the reaction link body 15 and are bonded together by the fastening members 18 (33, 34, 35). Note that the linear portion end members (27, 28) and the body member 23 are provided, for example, as members having different carbon fiber orientations in a direction perpendicular to the thickness direction of the reaction link body 15.

Next, the actuation of the control surface drive unit 1 will be described. When the control surface 102 is driven, a hydraulic system is actuated in accordance with an instruction from a controller (not shown), and pressure oil is supplied and discharged to and from the cylinder body 13 of the actuator 11. As a result of supplying/discharging pressure oil, the rod portion 14 is displaced such that it extends or contracts from or into the cylinder body 13. Consequently, the control surface 102 is driven at one end of the rod portion 14 of the actuator 11 that is pivotable about the pivot shafts 31. At that time, one end of the reaction link body 15 is attached pivotably to the fulcrum shaft 30 of the control surface 102 and the other end thereof is attached pivotably to the pivot shafts 31 as described above, and therefore the control surface 102 is driven so as to pivot about the fulcrum shaft 30.

As described above, with the control surface drive unit (actuator-link assembly) 1, in order to stably drive the control surface 102 via actuation of the actuator 11, the reaction link (link) 12 is provided that is formed in the shape of a portal including the pair of linear portions 19 and the coupling portion 20 coupling to the pair of linear portions 19 via the bent portions (29a, 29b). In the case of a conventional portal-shaped link that is made of a metallic material such as a titanium alloy or stainless steel and that includes bent portions, it is difficult to realize further weight reduction, while ensuring strength and rigidity in good balance. However, with the control surface drive unit 1, the pair of linear portions 19 and the coupling portion 20 of the reaction link 12 are made of fiber reinforced plastic. Accordingly, it is possible to achieve a control surface drive unit 1 that has a significantly smaller specific gravity (i.e., also has a significantly smaller density), a significantly greater specific strength and a significantly greater specific rigidity than that achieved with a titanium alloy. Further, it is possible to achieve a control surface drive unit 1 that has a significantly greater specific strength and a significantly greater specific rigidity than that achieved with stainless steel. This makes it possible to ensure strength and rigidity in good balance at a higher level and to realize significant weight reduction for a control surface drive unit (actuator-link assembly). Thus, it is possible, with this embodiment, to realize weight reduction for a control surface drive unit (actuator-link assembly) including a portal-shaped reaction link, compared with their conventional counterparts made of metals such as a titanium alloy and stainless steel, and to ensure strength and rigidity that are equal to or greater than those achieved with the counterparts.

[Actuator-Link Assembly Manufacturing Method, and Actuator-Link Assembly Designing Method]

Next, an actuator-link assembly manufacturing method according to this embodiment and an actuator-link assembly designing method according to this embodiment will be described. The actuator-link assembly manufacturing method according to this embodiment constitutes a manufacturing method for manufacturing the actuator 11 and the reaction link (link) 12 of the control surface drive unit 1. The actuator-link assembly designing method according to this embodiment constitutes a designing method for designing the actuator 11 and the reaction link (link) 12 of the control surface drive unit 1. Note that the actuator-link assembly manufacturing method according to this embodiment includes the actuator-link assembly designing method according to this embodiment as a constituting element.

Figure 6:
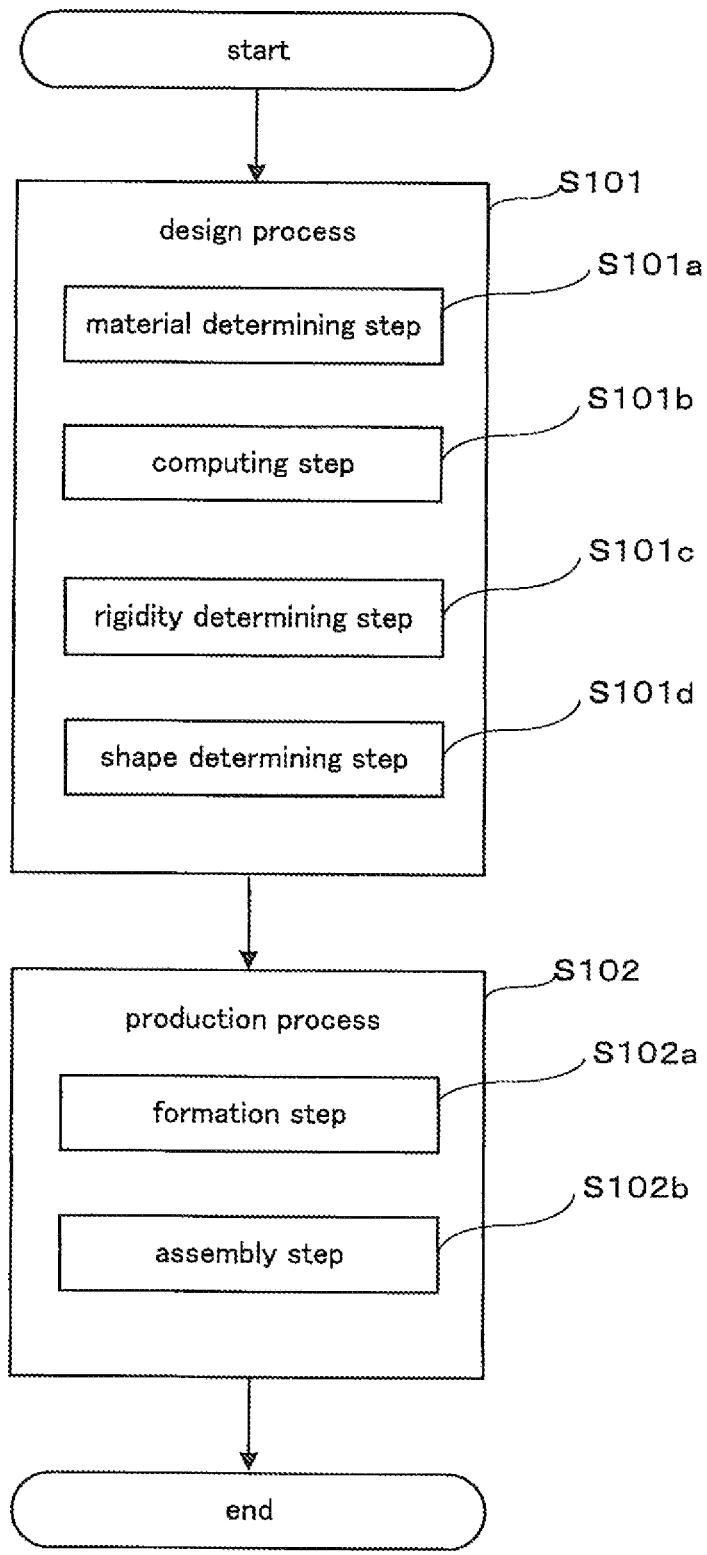
FIG. 6 is a flowchart illustrating an actuator-link assembly manufacturing method according to one embodiment of the present invention.

FIG. 6 is a flowchart illustrating the actuator-link assembly manufacturing method according to this embodiment (hereinafter, may also be simply referred to as the "manufacturing method of this embodiment"). As shown in FIG. 6, the manufacturing method of this embodiment includes a design process S101 constituting the actuator-link assembly designing method according to this embodiment (hereinafter, may also be simply referred to as the "designing method of this embodiment"), and a production process S102.

Figure 7:
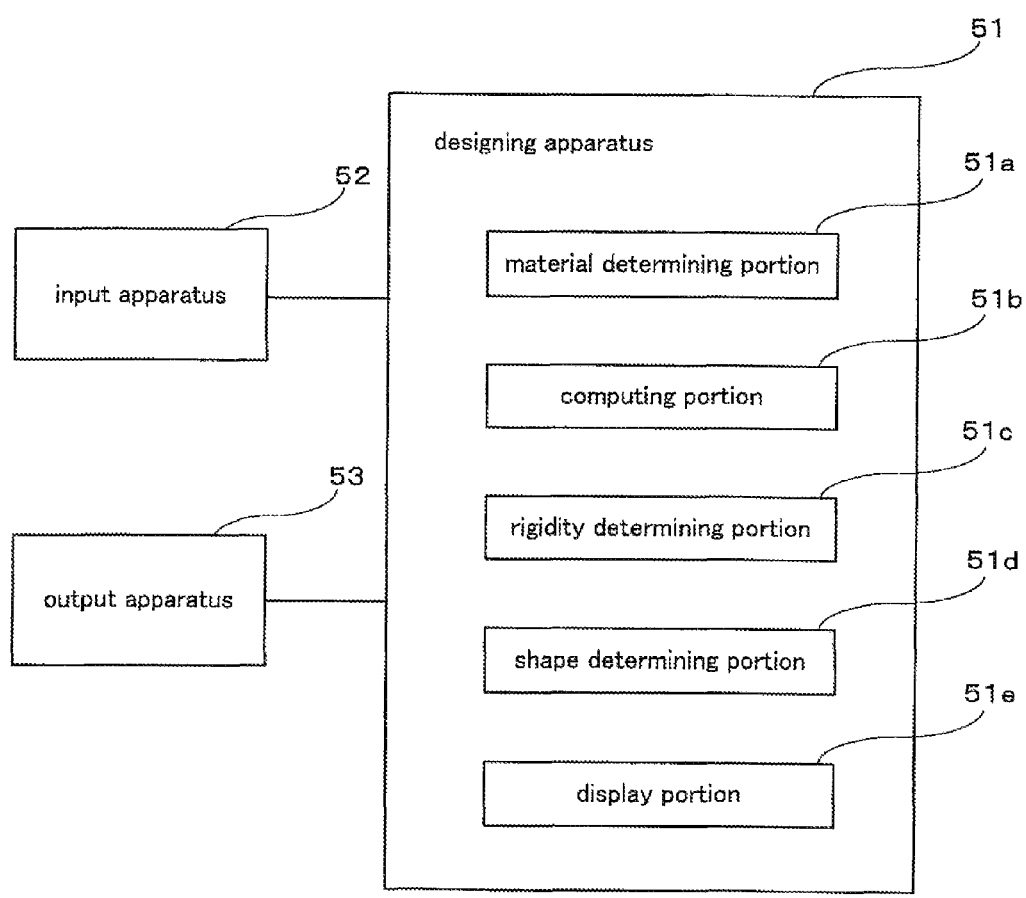
FIG. 7 is a functional block diagram of a designing apparatus that performs a design process of the manufacturing method shown in FIG. 6.

The design process S101 includes a material determining step S101a, a computing step S101b, a rigidity determining step S101c, and a shape determining step S101d. The design process S101 is performed by a designing apparatus 51 shown in FIG. 7 operating in accordance with an input operation performed by a user (operator) (not shown) through an input apparatus 52. FIG. 7 is a functional block diagram showing the designing apparatus 51, together with the input apparatus 52 and an output apparatus 53.

The designing apparatus 51 that performs the design process S101 is provided as a computer apparatus capable of executing a program, and includes a CPU (Central Processing Unit), a memory, an input/output interface, and so forth, which are not shown. In the designing apparatus 51, a program that is stored on the memory and is configured to perform the design process S101 is read and executed by the CPU. Consequently, in the designing apparatus 51, a material determining portion 51a that performs the material determining step S101a, a computing portion 51b that performs the computing step S101b, a rigidity determining portion 51c that performs the rigidity determining step S101c, a shape determining portion 51d that performs the shape determining step S101d, a display portion 51e that causes the output apparatus 53 to display, for example, a computation result obtained by the computing portion 51b, and so forth are constructed.

Further, the designing apparatus 51 is connected to the input apparatus 52 and the output apparatus 53. The input apparatus 52 is an apparatus through which the user inputs an operation for the designing apparatus 51. For example, the input apparatus 52 is provided as an input device, including, for example, a keyboard, and a pointing device such as a mouse. The user can use the input apparatus 52 to input, into the designing apparatus 51, predetermined data required to perform the design process S101, and to operate the designing apparatus 51. The output apparatus 53 is provided, for example, as a display apparatus including a display screen, and displays a result of processing performed, for example, by the computing portion 51b, in accordance with the control performed by the display portion 51e of the designing apparatus 51.

The material determining step S101a of the design process S101 is configured as a step of determining the material constituting the actuator 11 and the material constituting the reaction link 12. In the material determining step S101a, the material of the actuator 11 is determined to be stainless steel, for example. For the reaction link 12, for example, the material of the bearing 16 and the fastening members 18 is determined to be stainless steel, the material of the bushes 17 is determined to be bronze, and the material of the reaction link body 15 is determined to be carbon fiber reinforced plastic.

Since the materials are determined in the above-described manner, the material of the plurality of members (23 to 28) constituting the reaction link body 15 is determined to be carbon fiber reinforced plastic, the material of the pair of linear portions 19 and the coupling portion 20 of the reaction link 12 is determined to be carbon fiber reinforced plastic. Note that the mode of the material determination in the material determining step S101a is not limited to the above-described example, and the materials may be determined such that at least one of the material constituting the actuator 11 and the material constituting the reaction link 12 contains fiber reinforced plastic.

The computing step S101b of the design process S101 is configured as a step of computing the change in gain margin with the change in a rigidity ratio, which is the ratio of the rigidity of the reaction link 12 to the rigidity of the actuator 11, using a computation model described below. The computation model used in the computing step S101b is configured as a computation model that includes the inertial mass of the control surface 102, the rigidity of the control surface 102, the rigidity of the actuator 11, the rigidity of the reaction link 12 as parameters, and that defines the relationship between the parameters. Note that the parameters of the inertial mass and rigidity of the control surface 102 are input into the designing apparatus 51 by the user operating the input apparatus 52, as data on inertial mass and rigidity that correspond to the control surface 102 to which the control surface drive unit 1 is applied. Likewise, data that are other than the data on the inertial mass and the rigidity corresponding to the control surface 102 and that are required for computation performed in the computing step S101b are also input into the designing apparatus 51 by the user operating the input apparatus 52.

Figure 8:
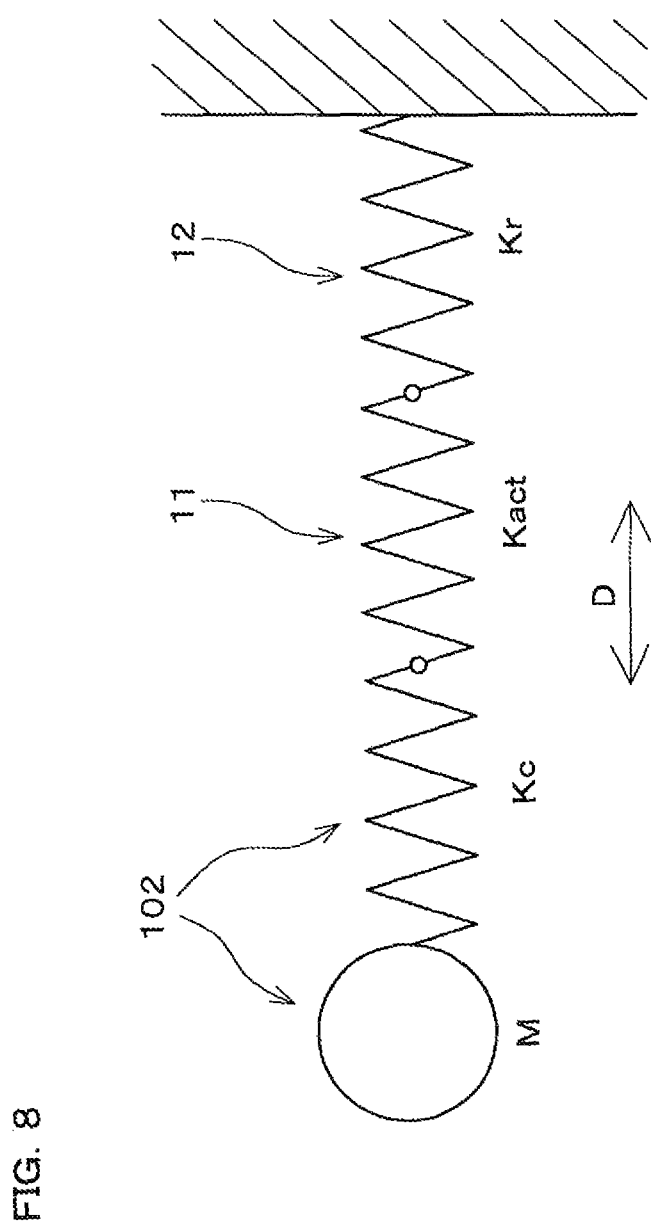
FIG. 8 is a diagram illustrating a computation model used in a computing step in the design process of the manufacturing method shown in FIG. 6.

FIG. 8 is a diagram illustrating the computation model used in the computing step S101b. As shown in FIG. 8, the computation model used in the computing step S101b is configured to define the relationship between the parameters, as a spring-mass model in which the inertial mass M of the control surface 102, a spring having a spring constant Kc, which is obtained by modeling the rigidity of the control surface 102, a spring having a spring constant Kact, which is obtained by modeling the rigidity of the actuator 11, and a spring having a spring constant Kr, which is obtained by modeling the rigidity of the reaction link 12, are coupled in series. Further, in the computing step S101b using this computation model, computation is performed under a condition in which oscillations are applied in the direction indicated by the double-ended arrow D in FIG. 8.

Figure 9:
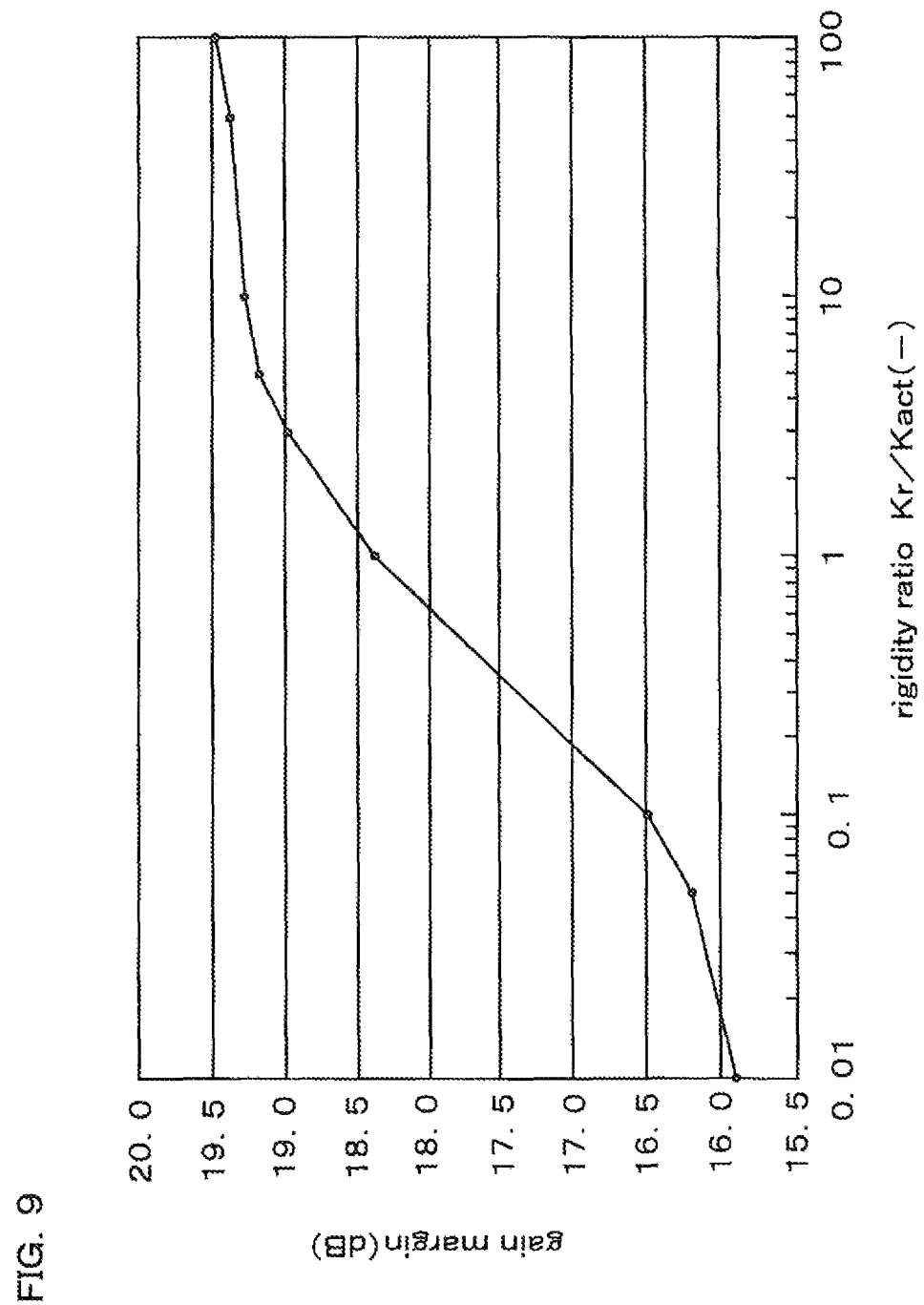
FIG. 9 is a graph illustrating a computation result obtained in the computing step in the design process of the manufacturing method shown in FIG. 6.

In the computing step S101b, the change in gain margin with the change in the rigidity ratio (Kr/Kact), which is the ratio of the rigidity (Kr) of the reaction link 12 to the rigidity (Kact) of the actuator 11, is computed using the above-described computation model. FIG. 9 is a graph illustrating a computation result for the change in gain margin with the change in the rigidity ratio (Kr/Kact). In FIG. 9, the longitudinal axis represents the gain margin, and the horizontal axis represents the rigidity ratio (Kr/Kact) as a logarithmic axis. Note that the designing apparatus 51 is configured such that, for example, the computation result shown in FIG. 9 is displayed to the output apparatus 53 in accordance with the control performed by the display portion 51e, and that the user can confirm that computation result.

The rigidity determining step S101c of the design process S101 is configured as a step of determining the rigidities of the actuator 11 and the reaction link 12 such that the rigidity ratio (Kr/Kact) and the gain margin fall within their respective predetermined ranges, based on the computation result obtained in the computing step S101b. For example, the lower limit of the rigidity ratio (Kr/Kact) and the gain margin in the above-mentioned predetermined ranges is set to 1.0 for the rigidity ratio (Kr/Kact) and 18.0 for the gain margin so as to ensure a higher rigidity and a higher gain margin than the control surface drive unit 1 in which the material of the actuator 11 is constituted by stainless steel and the material of the reaction link 12 is constituted by a titanium alloy. For example, the upper limit of the rigidity ratio (Kr/Kact) and the gain margin in the above-mentioned predetermined ranges is set to 10.0 for the rigidity ratio (Kr/Kact) and 20.0 for the gain margin such that the range of the rigidity ratio (Kr/Kact) is smaller than a range in which the change in gain margin with an increase in the rigidity ratio (Kr/Kact) is substantially convergent and hence the effect of further increasing the gain margin with an increase in the ratio (Kr/Kact) (i.e., the effect of further increasing the control stability) cannot be achieved (i.e., such that the range of the rigidity ratio (Kr/Kact) is within a range that is expected to achieve the effect of increasing the control stability). In the rigidity determining step S101c, the rigidity ratio (Kr/Kact) and the gain margin are determined to be certain values within the above-described predetermined ranges based on predetermined conditions regarding, for example, the weight and the strength, and moreover, the rigidity of the actuator 11 and the rigidity of the reaction link 12 are determined based on that rigidity ratio (Kr/Kact). For example, the designing apparatus 51 is configured such that the rigidity values of the actuator 11 and the reaction link 12 determined in the rigidity determining step S101e can be displayed to the output apparatus 53 in accordance with the control performed by the display portion 51e, and that the user can confirm the result of this process.

Figure 10:
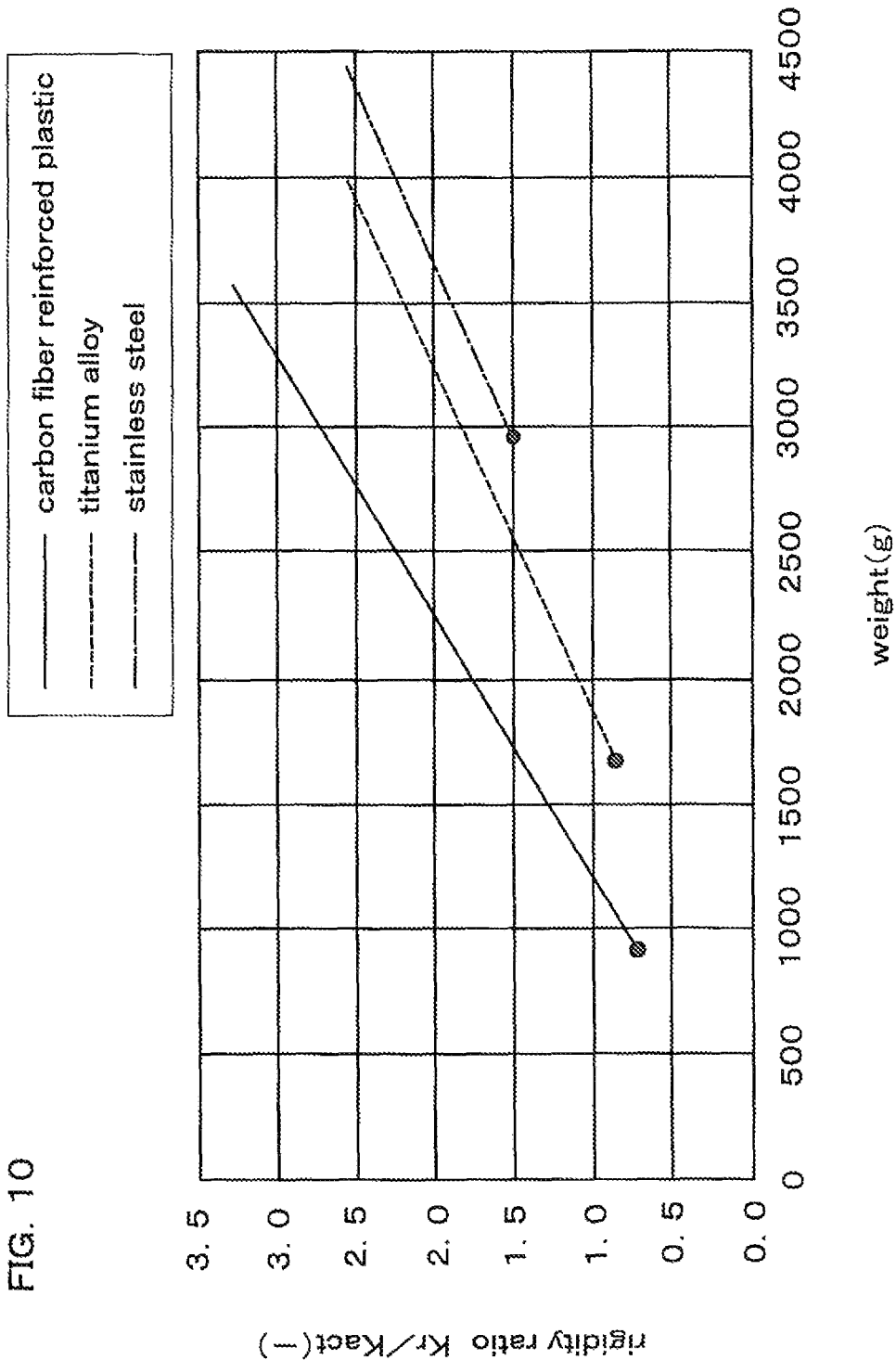
FIG. 10 is a graph illustrating the results of analyzing the relationship between the rigidity ratio and the weight of an actuator-link assembly designed with the design process of the manufacturing method shown in FIG. 6, for varying constituting materials.

FIG. 10 is a graph illustrating results of analyzing the relationship between the weight (g) of the reaction link 12 and the rigidity ratio (Kr/Kact) for cases where the material of the actuator 11 is constituted by stainless steel and the material of the reaction link 12 is constituted by carbon fiber reinforced plastic, a titanium alloy, or stainless steel. Note that the analysis result for the case where the material constituting the reaction link 12 is carbon fiber reinforced plastic is indicated by the solid line, the analysis result for the case where the material constituting the reaction link 12 is a titanium alloy is indicated by the broken line, and the analysis result for the case where the material constituting the reaction link 12 is stainless steel is indicated by the alternate long and short dash line. With regard to the analysis results, calculations are carried out with the weight and the rigidity ratio (Kr/Kact) being varied by varying the dimensional requirement on the thickness of the members (23 to 28) constituting the reaction link body 15. Further, the calculation conditions (lower limit conditions) that can ensure the lower limit strengths required as the reaction link 12 of the drive unit 1 for driving the control surface 102 are indicated by the filled circles.

As shown in FIG. 10, when the material constituting the reaction link 12 is carbon fiber reinforced plastic, it is possible to ensure strength that is greater than or equal to that achieved when the material constituting the reaction link 12 is stainless steel or a titanium alloy, and to ensure a higher rigidity, thus realizing further significant weight reduction. Furthermore, as shown in FIG. 10, when the material constituting the reaction link 12 is carbon fiber reinforced plastic, setting the rigidity ratio (Kr/Kact) to 1.0 or greater makes it possible to achieve a higher rigidity and greater weight reduction than those achieved under the lower limit condition under which the greatest weight reduction is achieved using the titanium alloy as the material constituting the reaction link 12.

In the shape determining step S101d of the design process S101, the shapes of the actuator 11 and the reaction link 12 are determined such that the rigidity of the actuator 11 and the rigidity of the reaction link 12 are set to the rigidities determined in the rigidity determining step S101c.

In the shape determining step S101d, for example, the thickness dimension of the cylinder portion of the cylinder body 13 and the diameter dimension of the shaft portion of the rod portion 14 are determined such that the rigidity of the actuator 11 is set to the rigidity determined in the determining step S101c, and thereby the shape of the actuator 11 is determined. Although a case where the shape of the cylinder body 13 is set to be cylindrical and the shape of the rod portion 14 is set to be a round bar shape having a circular cross section is described as an example in this embodiment, this need not be the case; the cross sectional shape may be set to be other cross sectional shapes. Further, the shape determining step S101d may have a mode in which a predetermined cross sectional shape is selected from a plurality of cross sectional shapes. In this case, for example, the shape determining step S101d may have a mode in which a cross sectional shape with which the rigidity determined in the rigidity determining step S101b can be achieved with the smallest amount of the material (with the greatest weight reduction) is selected.

In the shape determining step S101d, for example, the geometry of the reaction link 12, including, for example, the thickness dimension and the width dimension of the members (23 to 28) of the reaction link body 15, the diameter dimension of the bearing 16, and the diameter dimension of the bushes 17 is determined such that the rigidity of the reaction link 12 is set to the rigidity determined in the rigidity determining step S101c, and thereby the shape of the reaction link 12 is determined. Although a case where the cross sectional shape of the reaction link body 15 is set to the predetermined cross sectional shape shown in FIGS. 3 to 5 is described as an example in this embodiment, this need not be the case; it is possible to set a configuration having another cross sectional shape, such as a configuration having a square tubular cross-sectional shape and a configuration having a plate-like cross sectional shape. Alternatively, a predetermined cross-sectional shape may be selected from a plurality of cross-sectional shapes. In this case, for example, a cross-sectional shape with which the rigidity determined in the rigidity determining step S101c can be achieved with the smallest amount of the material (with the greatest weight reduction) may be selected. Note that the designing apparatus 51 is configured such that, for example, the shapes of the actuator 11 and the reaction link 12 that have been determined in the shape determining step S101d are displayed to the output apparatus 53 in accordance with the control performed by the display portion 51e, and that the user can confirm the result of this process.

The production process S102 includes a formation step S102a and an assembly step S102b. In the production process S102, the actuator 11 and the reaction link 12 that have been designed in the design process S101 are produced.

The formation step S102a of the production process S102 is configured as a step of forming the actuator 11 and the reaction link 12 into the shapes determined in the shape determining step S101d. In the formation step S102a, the cylindrical cylinder body 13 and the round bar-shaped rod portion 14 are processed with stainless steel into predetermined shapes, and are assembled into one unit as the actuator 11.

In the formation step S102a, the members (23 to 28) having the predetermined shapes shown in FIGS. 3 to 5 are formed with carbon fiber reinforced plastic into predetermined geometries. Also, these members (23 to 28) are bonded together with the fastening members 18, and are integrated into one unit as the reaction link body 15, and the bearing 16 and the bushes 17 are also assembled to the reaction link body 15, thus forming the reaction link 12. Note that the operation of assembling the bearing 16 and the bushes 17 may be carried out before or in the middle of the operation of bonding the members (23 to 28), instead of being carried out after the bonding operation.

The assembly step S102b of the production process S102 is configured as a step of coupling and assembling the actuator 11 and the reaction link 12 that have been formed in the formation step S102a. In the assembly step S102b, the pivot shafts 31 integrally formed with the cylinder body 13 of the actuator 11 are inserted through the bushes 17 of the reaction link 12, and thereby the actuator 11 and the reaction link 12 are coupled and assembled. Note that the formation step S102a and the assembly step S102b may be performed in parallel; for example, it is possible to adopt a configuration in which the operation of inserting the pivot shafts 31 through the bushes 17 is performed in the middle of the formation step S102a and thereafter the formation of the reaction link 12 is completed.

Finishing the production process S102 described above completes the manufacturing method of this embodiment shown in FIG. 6, thus manufacturing the control surface drive unit (actuator-link assembly) 1 shown in FIG. 1.

As described above, with the actuator-link assembly manufacturing method according to this embodiment and the actuator-link assembly designing method according to this embodiment, the material constituting the reaction link 12 is determined such that it contains fiber reinforced plastic. Accordingly, it is possible to achieve a control surface drive unit (actuator-link assembly) 1 that has a significantly smaller specific gravity (i.e., also has a significantly smaller density), a significantly greater specific strength and a significantly greater specific rigidity than that achieved with a titanium alloy. Further, it is possible to achieve a control surface drive unit (actuator-link assembly) 1 that has a significantly greater specific strength and a significantly greater specific rigidity than that achieved with stainless steel. Also, based on the computation result obtained using the computation model for the control surface 102, the actuator 11, and the reaction link 12, the rigidities of the actuator 11 and the reaction link 12 are determined such that the rigidity ratio (Kr/Kact) of the reaction link 12 to the actuator 11 and the gain margin fall within their respective predetermined ranges that have been set. Consequently, the rigidity of the control surface drive unit (actuator-link assembly) 1 containing fiber reinforced plastic as the constituent material can be reliably determined to be a level capable of sufficiently suppressing deformation and ensuring sufficient stability as the control system for driving the control surface 102. Also, the design of the actuator 11 and the reaction link 12 is completed upon determination of their shapes such that the rigidities determined in the above described manner can be set. Furthermore, when the actuator 11 and the reaction link 12 are formed in the shapes determined in the above-described manner and are further coupled and assembled, the manufacture of the control surface drive unit (actuator-link assembly) 1 is completed. Thus, it is possible to design and manufacture a control surface drive unit (actuator-link assembly) 1 that can realize weight reduction compared with conventional actuator-link assemblies made of metals such as a titanium alloy and stainless steel, and ensure strength and rigidity that are equal to or greater than those achieved with such actuator-link assemblies.

Accordingly, with the actuator-link assembly manufacturing method according to this embodiment, it is possible to design and manufacture a control surface drive unit (actuator-link assembly) 1 that can ensure strength and rigidity that are equal to or greater than those achieved with conventional actuator-link assemblies, and realize further weight reduction.

Furthermore, with the actuator-link assembly designing method according to this embodiment, in order to stably drive the control surface 102 via actuation of the actuator 11, the reaction link 12 is designed that is formed in the shape of a portal including the pair of linear portions 19 and the coupling portion 20 coupling to the pair of linear portions 19 via the bent portions (29a, 29b). In the case of a portal-shaped reaction link including bent portions, it is difficult to realize weight reduction, while ensuring strength and rigidity in good balance. However, with the designing method of this embodiment, the material constituting the pair of linear portions 19 and the coupling portion 20 of the reaction link 12 is determined to be fiber reinforced plastic, and therefore it is possible to ensure strength and rigidity in good balance at a higher level, and to realize significant weight reduction.

Furthermore, with the actuator-link assembly designing method according to this embodiment, the computation model used in the computing step S101b is configured for the control surface 102, the actuator 11 and the reaction link 12 as a spring-mass model in which the inertial mass and the springs thereof are coupled in series. Accordingly, a computation model for more accurately defining the relationship between the parameters of the inertial mass M of the control surface 102, the rigidity (spring constant Kc) of the control surface 102, the rigidity (spring constant Kact) of the actuator 11, and the rigidity (spring constant Kr) of the reaction link 12 can be achieved with a simple computation model, based on the actual relationship between the control surface 102, the actuator 11, and the reaction link 12 that are coupled in series.

Although an embodiment of the present invention has been described thus far, the present invention is not limited to the above-described embodiment, and various modifications may be made within the scope recited in the claims. For example, the following modifications are possible.

(1) Although this embodiment has been described, taking as an example, a configuration in which the material constituting the link contains fiber reinforced plastic, this need not be the case. That is, it is possible to adopt a configuration in which only the material constituting the actuator contains fiber reinforced plastic, or a configuration in which both the material constituting the link and the material constituting the actuator contain fiber reinforced plastic.

(2) The shapes of the actuator and the reaction link are not limited to those illustrated in this embodiment, and various modifications may be made. Furthermore, the present invention may be applied to a link having a configuration other than that of the reaction link illustrated in this embodiment.

The present invention can be applied widely to an actuator-link assembly including an actuator that can be attached to a control surface of an aircraft or to a horn arm member in order to drive the control surface, and a link that is coupled to that actuator, a manufacturing method for manufacturing the actuator-link assembly, and a designing method for designing the actuator-link assembly. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An actuator-link assembly manufacturing method for manufacturing an actuator that can be attached pivotably, at one end thereof, to a control surface of an aircraft or to a horn arm member attached to the control surface in order to drive the control surface, and a link that is coupled to the actuator, the method comprising:
    a material determining step of determining a material constituting the actuator and a material constituting the link;
    a computing step of computing a change in gain margin with a change in a rigidity ratio, which is the ratio of the rigidity of the link to the rigidity of the actuator, using a computation model that includes an inertial mass of the control surface, a rigidity of the control surface, a rigidity of the actuator, and a rigidity of the link as parameters and that defines a relationship between the parameters;
    a rigidity determining step of determining rigidities of the actuator and the link such that the rigidity ratio and the gain margin fall within respective predetermined ranges, based on a computation result obtained in the computing step;
    a shape determining step of determining shapes of the actuator and the link such that rigidities of the actuator and the link are set to the rigidities determined in the rigidity determining step;
    a formation step of forming the actuator and the link into the shapes determined in the shape determining step; and
    an assembly step of coupling and assembling the actuator and the link formed in the formation step,
    wherein the link is attached pivotably to a fulcrum shaft for rotatably supporting the control surface, and is also attached pivotably to the other end of the actuator via a pivot shaft, and,
    in the material determining step, the materials are determined such that at least one of the material constituting the actuator and the material constituting the link contains fiber reinforced plastic.

2. An actuator-link assembly designing method for designing an actuator that can be attached pivotably, at one end thereof, to a control surface of an aircraft or to a horn arm member attached to the control surface in order to drive the control surface, and a link that is coupled to the actuator, the method comprising:
    a material determining step of determining a material constituting the actuator and a material constituting the link;
    a computing step of computing a change in gain margin with a change in a rigidity ratio, which is the ratio of the rigidity of the link to the rigidity of the actuator, using a computation model that includes an inertial mass of the control surface, a rigidity of the control surface, a rigidity of the actuator, and a rigidity of the link as parameters and that defines a relationship between the parameters;
    a rigidity determining step of determining rigidities of the actuator and the link such that the rigidity ratio and the gain margin fall within respective predetermined ranges, based on a computation result obtained in the computing step; and a shape determining step of determining shapes of the actuator and the link such that rigidities of the actuator and the link are set to the rigidities determined in the rigidity determining step, wherein the link is attached pivotably to a fulcrum shaft for rotatably supporting the control surface, and is also attached pivotably to the other end of the actuator via a pivot shaft, and, in the material determining step, the materials are determined such that at least one of the material constituting the actuator and the material constituting the link contains fiber reinforced plastic.

3. The actuator-link assembly designing method according to claim 2, wherein the link comprises:

a pair of linear portions disposed alongside each other and each extending linearly;

a coupling portion connecting to one end of each of the pair of linear portions on the same side via a bent portion and extending so as to couple the one end of each of the pair of linear portions on the same side to each other;

a fulcrum shaft attachment portion that is provided so as to protrude from a center portion of the coupling portion and that can be attached pivotably to a fulcrum shaft for rotatably supporting the control surface; and an actuator attachment portion that is provided as the other end of each of the pair of linear portions and that can be attached pivotably to the other end of the actuator via a pivot shaft, and, in the material determining step, the materials are determined such that a material constituting the pair of linear portions and the coupling portion contains fiber reinforced plastic.

4. The actuator-link assembly designing method according to claim 2, wherein the computation model used in the computing step defines a relationship between the parameters, as a spring-mass model in which the inertial mass of the control surface, a spring obtained by modeling the rigidity of the control surface, a spring obtained by modeling the rigidity of the actuator, and a spring obtained by modeling the rigidity of the link are coupled in series.

* * * * *